United States Patent [19]

Ozaki et al.

[11] Patent Number: 4,707,751
[45] Date of Patent: Nov. 17, 1987

[54] SUPPORTING DEVICE OF A SHAFT DRIVE OF A MAGNETIC RECORD AND REPRODUCTION DEVICE

[75] Inventors: Yoshiaki Ozaki; Mahito Takanashi, both of Tokyo, Japan

[73] Assignee: Janome Sewing Machine Co. Ltd., Tokyo, Japan

[21] Appl. No.: 708,340

[22] Filed: Mar. 5, 1985

[30] Foreign Application Priority Data

Jul. 9, 1984 [JP] Japan ................. 58-102550

[51] Int. Cl.⁴ .............................. G11B 5/012
[52] U.S. Cl. ...................... 360/97; 360/99; 369/270; 464/180
[58] Field of Search ................. 360/97-99, 360/86, 133; 369/270-271; 74/399, 403; 474/113; 464/180

[56] References Cited

U.S. PATENT DOCUMENTS

| | | | |
|---|---|---|---|
| 2,157,158 | 5/1939 | Blessing et al. | 369/263 |
| 4,089,029 | 5/1978 | Castrodale et al. | 360/99 |
| 4,387,453 | 6/1983 | Zolt | 369/263 |

*Primary Examiner*—Stuart N. Hecker
*Assistant Examiner*—David J. Severin
*Attorney, Agent, or Firm*—Michael J. Striker

[57] ABSTRACT

In a supporting device for supporting a shaft drive for rotating a magnetic disc inserted in a magnetic recording and reproduction device, a motor-driven shaft, provided with a hub applicable to a magnetic disc to impart rotation thereto and a pulley driven by a motor, is supported in bearings fixed in the base of the reproduction device. An elastic curved plate engageable in the base and a thin plate surround the shaft and are positioned between the base and the pulley to continually press the pulley in an axial direction away from the magnetic disc and to this pre-stress the shaft drive.

3 Claims, 4 Drawing Figures

FIG_1
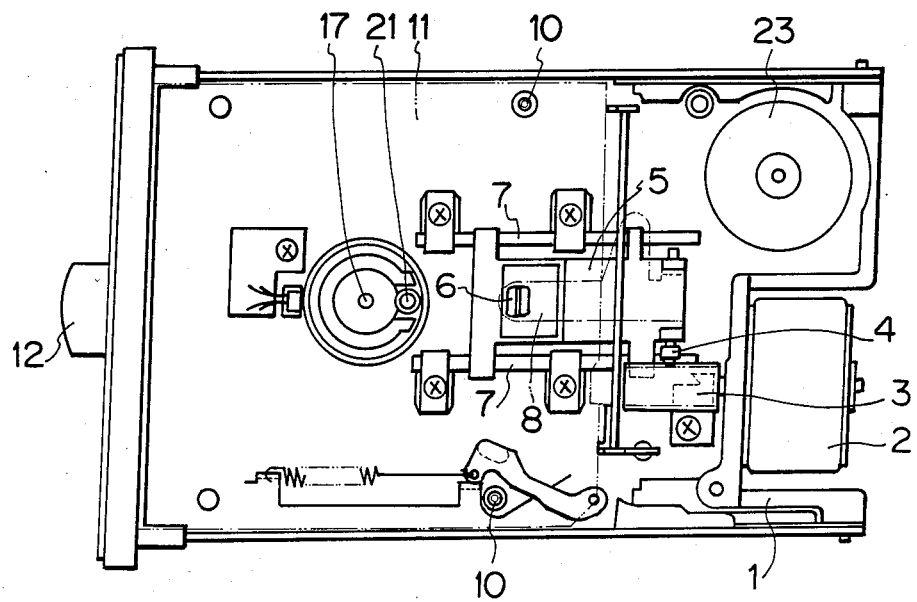
FIG_2
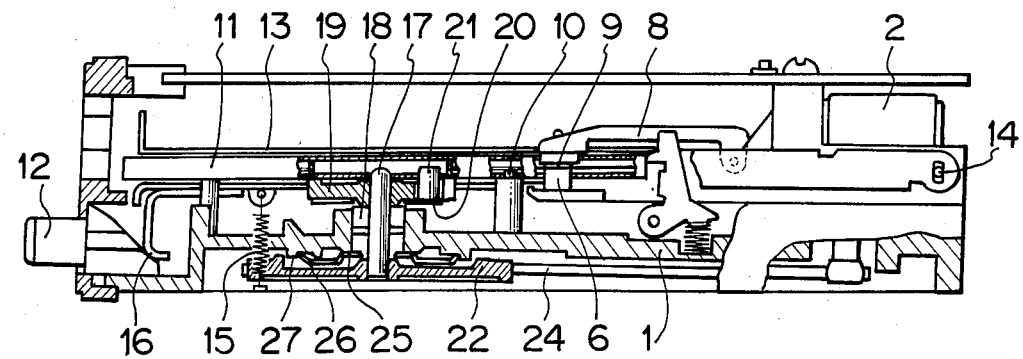

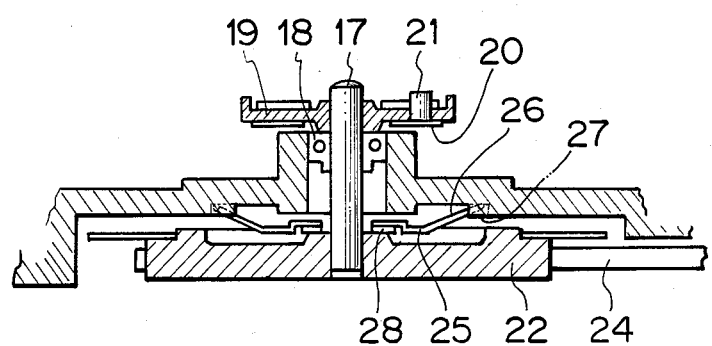
FIG_3
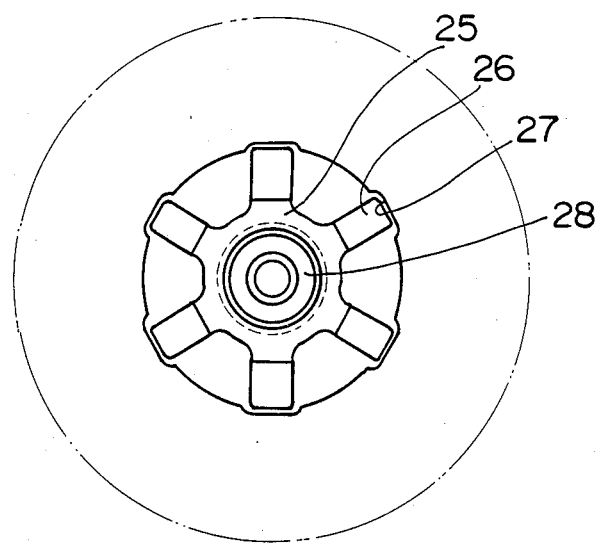
FIG_4

SUPPORTING DEVICE OF A SHAFT DRIVE OF A MAGNETIC RECORD AND REPRODUCTION DEVICE

BACKGROUND OF THE INVENTION

1. Field of the Invention

This invention relates to a support device of a drive shaft of a magnetic disc of a magnetic record and reproduction device.

2. Summary of the Invention

An object of the invention is to support a driving shaft of a magnetic disc of a magnetic recording and reproduction device such that the driving shaft is smoothly rotated, to keep a precision in supporting the shaft in an axial direction, and to secure a smooth carrying out of the recording and reproduction of the magnetic disc.

This and other objects of the invention are attained by a supporting device for supporting a drive for rotating a disc cassette insertable into a cassette holder of a magnetic recording and reproduction device wherein said drive includes a motor-driven spindle, a hub integral with said spindle and being operative for imparting rotation to the disc cassette, and a pulley fixed to an end of the spindle and rotated by a motor; the supporting device comprising bearing means fitted in a base of the recording and reproduction device and rotatably supporting the spindle; said pulley being spaced from the base to form a space therebetween; and a curved plate surrounding said spindle and positioned in said space, said curved plate being formed of elastic material and having a radially outwardly extended portion, said base being formed with a concave recess, said portion of the curved plate being engaged in said recess, whereby said pulley is continually pressed by said plate to prepress said drive.

The device may further include a thin plate surrounding the spindle and inserted between said pulley and said curved plate.

The thin plate may be made of material having a low friction coefficient.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a plan view of the invention;
FIG. 2 is a side view of the above;
FIG. 3 is a cross sectional view of an element part of the invention on an enlarged scale; and
FIG. 4 is a plan view of the part of FIG. 3.

DETAILED DESCRIPTION OF THE PREFERRED EMBODIMENT OF THE INVENTION

The present invention will be explained in reference to an embodiment shown in the attached drawings. The numeral 1 designates a base of a mechanism. Numeral 2 is a control motor secured to a vertical wall of the base such that a rotation shaft of the motor is arranged horizontally. Numeral 3 designates a feed screw which is rotated reciprocally and angularly by control motor. 4 is a follower of needle shape which is placed at its end between the threads of the feed screw 3 and is moved in an axial direction of the screw by the rotation of the feed screw 3. 5 is a carriage which supports follower 4 horizontally at its end, and is movably supported on two guide shafts 7 provided horizontally on the base 1 so that it is movable on a magnetic disc set with the recording and reproducing head 6 in a normal position.

The numeral 8 denotes a pad arm which is swingably supported on the carriage 5, and moderately presses down the magnetic disc to the head 6 with a pad 9 provided at its end portion.

The numerals 10 (10) are support pins for holding the disc cassette 11, housing the magnetic disc therein in the normal position, said pin 10 being positioned in holes formed in the disc cassette 11.

The numeral 12 designates an eject button which is an operating member for taking out the disc cassette 11 accommodated in cassette holder 13 which is, at its one end, pivoted to the base 1 at pivot 14 and is, at the other end, biased downward by a spring 15. If the eject button 12 is pushed, by an operator cassette holder 13 is upheld to a level of setting the disc cassette 11, via a cross member 16 cooperating with the end of the button, against the action of spring 15.

The numeral 17 denotes a spindle which is rotatably supported in the base 1 through a bearing 18, and is fixed with a spindle hub 19 at its upper portion, said spindle hub 19 being provided with a driving pin 21 secured to a spring plate 20 in its eccentric position.

The numeral 22 is a pulley which is fixed at the lower end of the spindle 17 and is rotated via a belt 24 by a motor 23 positioned on an appropriate portion of the base.

Referring to FIGS. 3 and 4, in a space between the pulley 22 and the base 1, a curved plate 25 is positioned, which is made of an elastic material and formed with a spindle hole coaxial with the spindle 17. The curved plate 25 is formed with a projection 26 at the outer circumference, and the projection 26 is engaged in a concave recess 27 formed in the base 1. Between the plate 25 and the pulley 22, a thin plate 28 is provided which is made of a substance of a low friction coefficient such as Nylon mixed with graphite in order not to damage the rotation of the pulley.

The present device is formed as set forth above. When the disc cassette 11 is inserted into the cassette holder 13 and set to the normal position, and the drive motor 23 is rotated, the spindle hub 19 is rotated via the pulley 22, so that the disc cassette 11 is rotated by the driving pin 21. When the control motor 2 is rotated angularly by the signal from another control device, the carriage 5 is moved via the feed screw 3 and the position of the head 6 relative to the magnetic cassette 11 is changed.

As set forth above, the curved plate 25 the outer circumference of which is engaged with the concave recess 27 of the base 1, is positioned with respect to the spindle 17 between the base 1 and the pulley 22, and the thin plate 28 which is smooth at its surface, is positioned between the curved plate 25 and the pulley 22. Therefore, the pulley is always pulled downward by a slight pressure, and the setting-up of the spindle 17 has no rattling in a direction of a thrust. The magnetic disc has high precision in the position in the axial direction of the spindle.

It will be understood that each of the elements described above, or two or more together, may also find a useful application in other types of supporting devices of shaft drives differing from the types described above.

While the invention has been illustrated and described as embodied in a supporting device of a shaft drive a recording device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fiarly constitute essential characteristics of the generic or specific aspects of this invention.

What is claimed as new and desired to be protected by Letters Patent is set forth in the appended claims:

1. A supporting device for supporting a drive for rotating a disc contained in a disk cassette inserted in a cassette holder of a magnetic recording and reproduction device, on a base of the recording and reproduction device wherein said drive includes a motor-driven spindle vertically extending through the base for rotation relative to the base and having a hub secured to an upper end of said spindle at an upper side of said base and a pulley secured to a lower end of the spindle at an underside of the base and rotated by a motor; the supporting device comprising bearing means fitted in said base and rotatably supporting said spindle, said pulley being spaced from the underside of said base to form a space therebetween; and a curved plate surrounding said spindle and positioned in said space, said curve plate being formed of elastic material and having radially outwardly extended portions; said base being formed with a concave recess on the underside thereof around said spindle, said radially extended portions of the curved plate engaging said concave recess so that said curved plate normally presses down said pulley to thereby press said hub against the upper side of the base and prevent the spindle against axial movement relative to the base.

2. The device as defined in claim 1, further including a thin plate surrounding the spindle and inserted between said pulley and said curved plate.

3. The device as defined in claim 2, wherein said thin plate is made of material having a low friction coefficient.

* * * * *